United States Patent [19]

Hellers

[11] Patent Number: 4,488,963
[45] Date of Patent: Dec. 18, 1984

[54] SEWAGE SYSTEM FOR WASTE WATER

[75] Inventor: Bo G. Hellers, Malmö, Sweden

[73] Assignee: Evak Sanitar AB, Bromolla, Sweden

[21] Appl. No.: 119,330

[22] Filed: Feb. 7, 1980

[30] Foreign Application Priority Data

Feb. 14, 1979 [SE] Sweden ............................ 7901303

[51] Int. Cl.³ .............................................. C02F 3/02
[52] U.S. Cl. ................................... 210/170; 210/173; 210/218; 137/205
[58] Field of Search ............ 137/205, 236 R; 210/104, 170, 194, 197, 218, 220

[56] References Cited

U.S. PATENT DOCUMENTS

| 3,115,148 | 12/1963 | Liljendahl | 137/205 |
| 3,670,890 | 6/1972 | Hall, Jr. et al. | 210/104 |
| 3,730,884 | 5/1973 | Burns et al. | 210/170 X |
| 3,804,255 | 4/1974 | Speece | 210/194 |
| 4,179,371 | 12/1979 | Foreman et al. | 210/170 X |

FOREIGN PATENT DOCUMENTS

| 2547485 | 4/1977 | Fed. Rep. of Germany | 210/170 |
| 389882 | 11/1976 | Sweden | 210/194 |
| 1525589 | 9/1978 | United Kingdom | 210/104 |

Primary Examiner—Robert Spitzer
Attorney, Agent, or Firm—Ladas & Parry

[57] ABSTRACT

A sewage system is provided for waste disposal units whose waste is removed by the supply of liquid and subsequent application of partial vacuum, for example vacuum closets. In order to make for the employment of large systems, the units are grouped such that a predetermined maximum partial vacuum transport distance is not exceeded. Each such group is connected to a converter in which the partial vacuum is converted into excess pressure which makes for long distance transport, by the intermediary of an intermediate step at atmospheric pressure. Moreover, the waste can be comminuted and oxygenated in the intermediate step of the converter, at the same time as the requisite partial vacuum is established.

7 Claims, 6 Drawing Figures

SEWAGE SYSTEM FOR WASTE WATER

The present invention relates to a sewage system for a plurality of waste disposal units which are emptied by means of the supply of liquid and the application of a partial vacuum, for example vacuum closets.

When it was introduced onto the market, the vacuum toilet system opened new horizons, not least from the point of view of environmental safety, for the improvement and simplification of waste disposal technology. At the point in time of its inception, the requirement for toilets connected to municipal sewer systems was for a flushing volume of 9 liters per flushing operation (a reduction to 6 liters was later accepted), whereas a vacuum toilet required only 1.2 liters. This small flushing volume made possible the provision of WC installations at places without access to municipal sewer systems and where the water supply situation demanded restraint. In the long term perspective, it was hoped that the vacuum technology would contribute to providing a solution to the problem of the steadily diminishing supply of fresh water.

Moreover, the small flushing volume involved allowed for technically and economically advantageous purification plants for waste water, which is taken to mean water from toilet installations, that is to say water containing faeces, urine and the like, with the result that such purification installations have been introduced on the market. Thanks to the vacuum toilet principle, it has also been possible to equip mobile units, boats, trains, buses etc. with WC installations which satisfy the comfort and hygiene requirements of today, not least from the point of view of the external environment.

As long as this technique was used in relatively small-scale installations (up to roughly 50 connected units) with relatively short transport distances (less than approximately 250 m) the system functioned by and large satisfactorily.

However, when the installations became larger and transport distances longer, such great problems have occurred that is has not been possible to realize the hopes that were raised for a general solution to the waste problem for entire communities and municipalities by means of the vacuum system, despite more than 20 years' zealous and, to a certain extent, successful development work as regards the various components of such a system.

This failure depends upon inherent limitations in the vacuum system as such, a few of the fundamental weaknesses being illustrated here.

1. In the use of the vacuum principle, a partial vacuum of at most 5 to 6 meters water column (50 to 60 kPa) can be maintained at the vacuum source in those installations which are extant in practice. The inevitable friction losses in the water transport thereby cause a considerable limitation of the conduit length which may be used.
2. A level difference which forms a counter gradient of 3 to 4 m can reduce the transport force by from 50 to 80%. Consequently, conduits should be laid such that inlets and outlets lie on the same level or preferably such that the conduit inclines in the direction of flow. Local counter-gradients of a few meters can have disastrous effects on the water transport capacity. It will be readily appreciated that demands placed from this point of view can often only be satisfied by troublesome, and above all, extremely expensive measures.
3. The sum total of experience shows that intermittent vacuum transport of liquid must take place by so-called plug transport, that is to say a unified, limited body of water, a "plug", is transported spaced apart from leading and following water plugs by a body of air. The demand for necessary acceleration at the moment of the flushing operation cannot be satisfied in any other way, and the transport is effected by means of an interrelated chain reaction between the plugs.

In order to prevent two or more plugs from flowing together to form an elongate body, the conduit must be profiled. In one case, this is achieved by providing the conduit with water-dividing summits at suitable points. In another case, "escape valves" have been installed. These water dividers render the installation more complex and expensive; the escape valves render the installation more expensive and weaken the transport capacity.

4. In the transport of waste of the type emanating from toilets, that is to say solid component parts mixed with water, the transport velocity must be high, >10 m/sec in order to prevent sedimentation and, if such sedimentation nevertheless occurs, to strip off the deposited layer. The driving force, that is the pressure drop per unit of length along the conduit must, because of this requirement, also exceed a certain critical value. It should also be noted that plug transport results in greater pressure losses in the same transport volume.

The object of the present invention is to obviate the above-outlined weaknesses and to make for installations of optional size and transport distances of optional length, in which case the system may also advantageously be used for day water, by which is meant domestic waste water from points other than toilets, for example waste water from washing-up, bathrooms and washing machines.

The object of the present invention is attained in that waste disposal units with a predetermined maximum partial vaccum transport distance are grouped into one or more groups, and that each group is connected to a remote transport system working with excess pressure, by the intermediary of a converter provided with means for converting the partial vacuum to excess pressure across an intermediate step at atmospheric pressure.

Consequently, all of the advantages and technical know-how of vacuum technology can be utilized in close range. Nevertheless, by placing the converter, or several converters, as close to the sources of waste as possible, all of the disadvantages which are inherent in vacuum transport over long distances will be eliminated. By the use of pressure, the volume and length of the waste water transport will be practically unlimited.

Moreover, solid components in the waste are, according to the invention, converted into finely-divided form and organic waste is degraded to a high degree under oxidizing conditions. As a result, there is no minimum critical transport velocity for the waste transport and the system supplies purified water.

The nucleus of the present invention is the converter station in which the partial vacuum of the system is converted to excess pressure. In the converter station, the solid component parts of the waste may also be converted into fine-grained material and the environment can, there, be placed under oxidizing conditions.

With these and other objects and aspects in view, the invention consists in the construction, arrangement and combination of the various parts of the system, whereby the objects contemplated are attained, as hereinafter more fully set forth and pointed out in the claims, and illustrated in the accompanying drawings, in which embodiments are illustrated schematically and in which:

Figure 6:
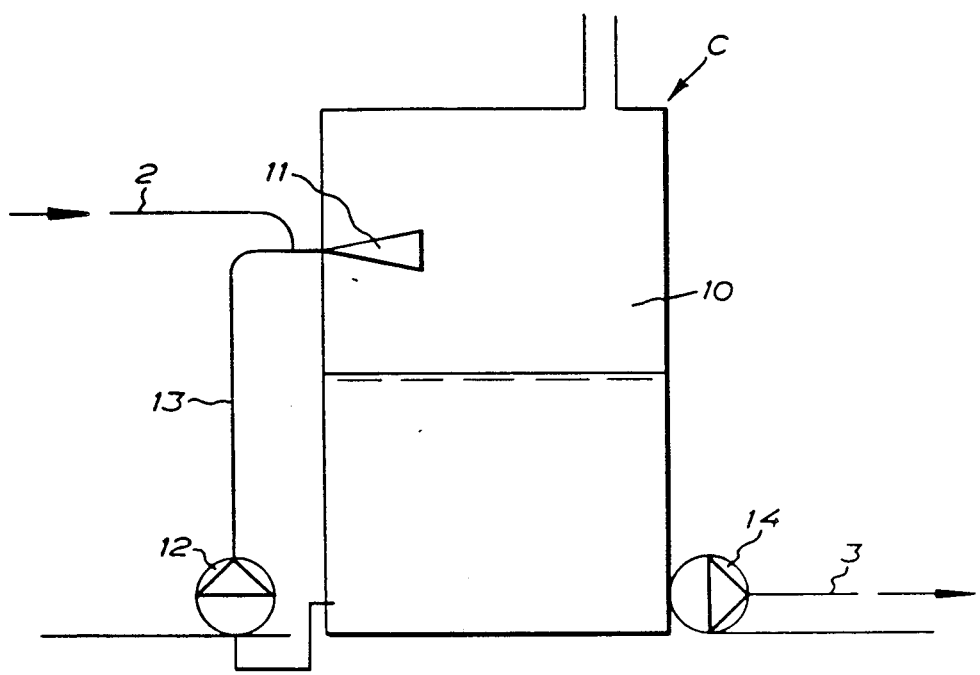

FIG. 6 schematically illustrates a converter utilized in the system.

Figure 1:
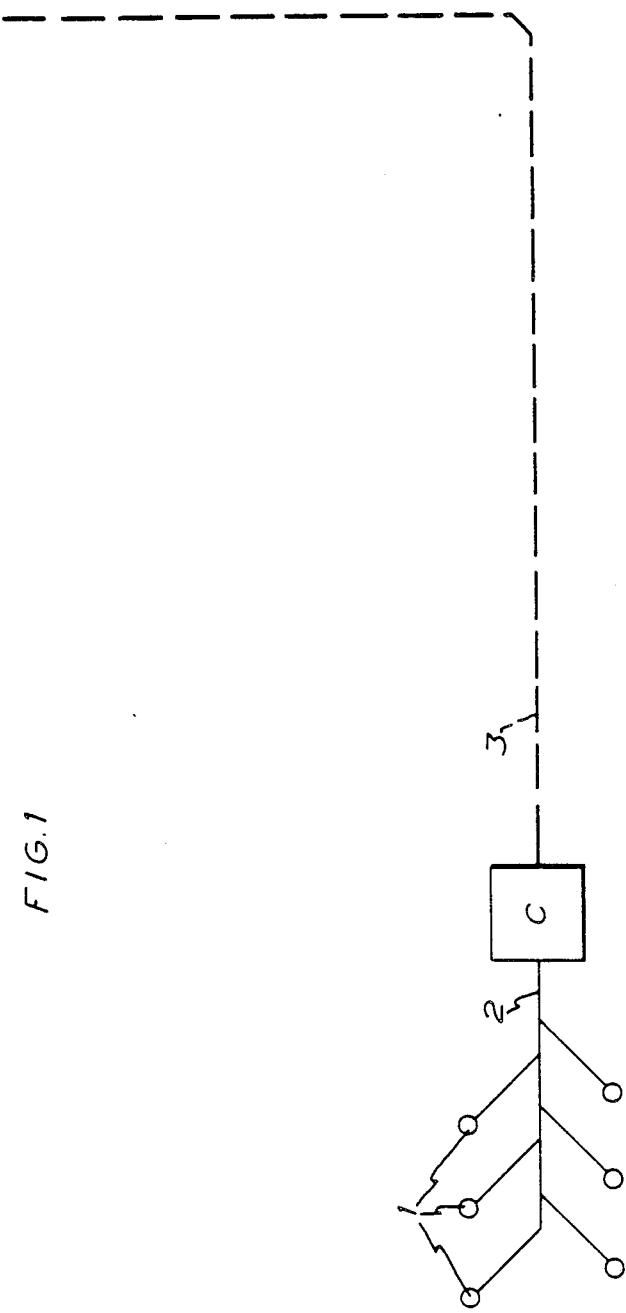
FIG. 1 illustrates the principle of a sewage system according to the invention.

FIG. 1 shows the principle of a simple installation according to the invention in which a mumber of vacuum toilets 1 are connected via conduits to a main vacuum conduit 2 which, in its turn, is connected to a converter C located close to the source of waste. As shown in FIG. 6, the converter comprises a receptacle 10 which is open to the atmosphere. The suction side of a centrifugal pump 12 is connected to the receptacle 10 in the vicinity of the bottom of the receptacle in order to suck liquid and supply this liquid to an ejector 11 by the intermediary of a conduit 13. The ejector 11 discharges in the upper region of the receptacle 10 such that the liquid may be caused to circulate. Solid particles (excrement, paper, etc.) are comminuted by means of the pump 12 to small pieces, preferably <1 mm. Oxygenation of the water takes place by means of the ejector 11. When the liquid which is under circulation passes the ejector 11, a partial vacuum is created. The conduit 2 is coupled to the suction side of the ejector 11 for the purposes of establishing the desired partial vacuum in the conduit 2. Waste which is transported along the conduit 2 by means of this partial vacuum is thus supplied to the ejector and to the receptacle 10 by the intermediary of the ejector in order there to participate in the circulation. The receptacle tank is dimensioned to accommodate at least twenty-four hours' waste, which, as experience has shown, results in the desired degradation of organic material.

A sewer 3 runs from the receptacle, through which the receptacle is emptied via a pump 14 coupled to the receptacle 10, suitably a centrifugal pump. The receptacle is provided with an upper and a lower level sensor (not shown) which start and stop the pump. The pump is dimensioned to generate the requisite pressure, suitably within the order of magnitude of from 20 to 40 m water column (from 0.2 to 0.4 MPa).

The installation operates in the following manner:

When a toilet is flushed, the vacuum source (not shown) is actuated and the contents of the toilet are sucked in a known manner through the vacuum conduit to the sluice of the converter station where the waste is introduced into the receptacle of the converter under comminution and oxygenation if desired. The comminution operation will eliminate the risk of sedimentation; a slow agitation may possibly be required in order to completely prevent deposition. The oxygenation will assist in the desired degradation of organic substances and the oxidizing conditions eliminate the formation of hydrogen sulfide which, apart from its noisome smell, reputedly entails a risk of explosion in downstream conduits, As a result of the long stay time in the tank, a considerable portion of the organic material will have time to decompose such that substantially odour-free and unobjectionable water departs from the receptacle.

A technically operational embodiment may, for example, consist of a comminuting circulation impeller and a coupled-in liquid-driven ejector according to Swedish Pat. No. 389,882.

When the upper accommodation limit of the receptacle has been reached, the pressure pump is activated and forces out the water into the sewer. Since sufficent transport force is available and since the solid material is finely-divided, there is no reason to make use of plug transport, the waste transport can instead take place with the conduit entirely full and at that speed which the volume demands; an optimum solution from the point of view of energy. Since the pressure level may be dimensioned according to need, there is no need for laying the conduit flat. Instead, the conduit may follow the contours of the terrain within reasonable limits. The skilled reader of this specification will readily appreciate the extraordinary economic advantages which are inherent in this freedom of disposition. When very long transport distances or great level differences are involved, pressure riser means can be employed in the system in a known manner.

Figure 2:
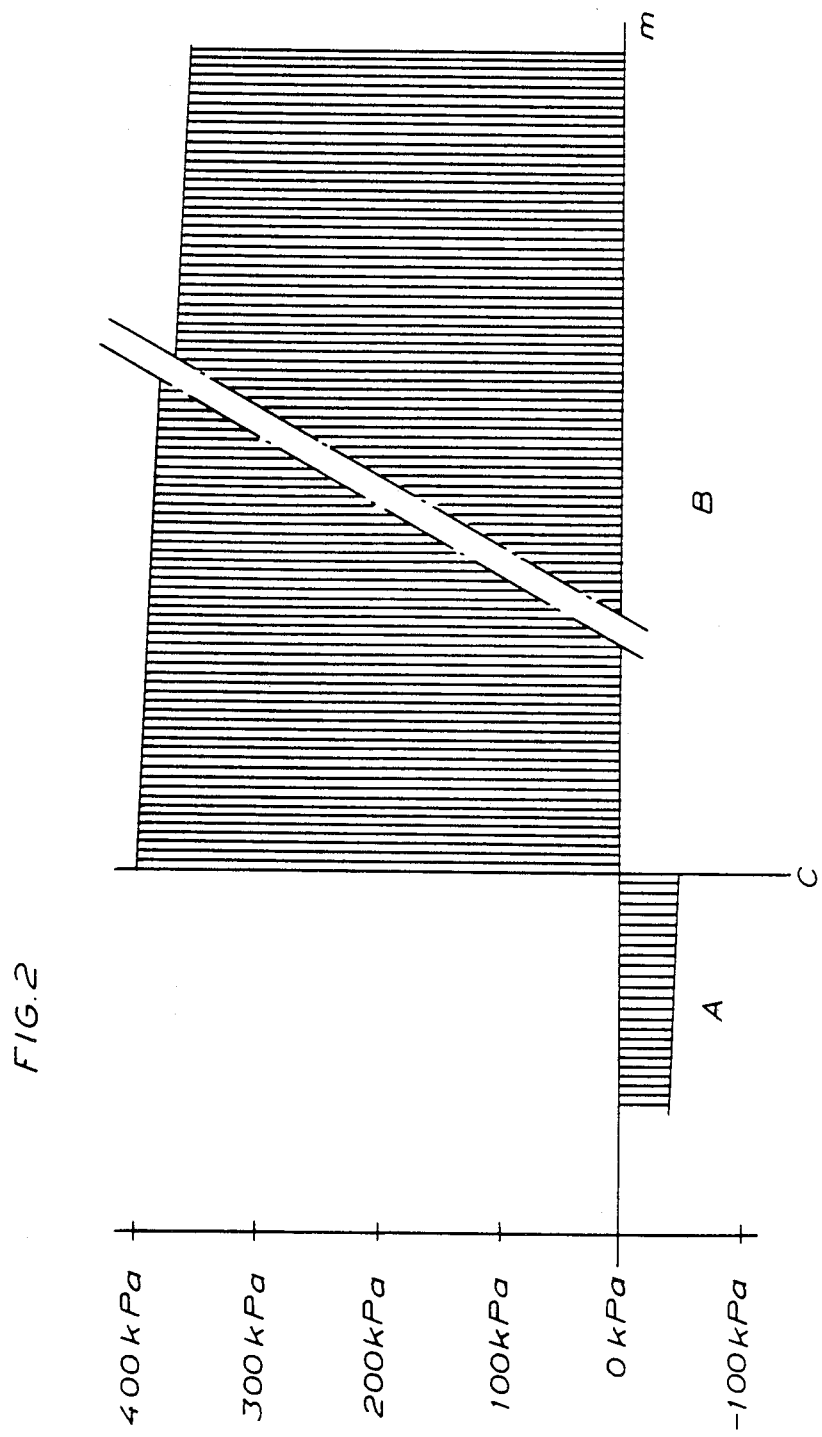
FIG. 2 illustrates the pressure conditions in the system of FIG. 1.

FIG. 2 graphically illustrates the pressure conditions ahead of and after the converter, the pressure being described along the ordinate and the conduit length along the abscissa. In extant vacuum installations, the available pressure difference throughout the entire conduit is not larger than that ahead of the converter. FIG. 2 has been drawn with an approximatively conceived maximum excess pressure on the pressure side, designated B, and an approximate maximum partial vacuum on the suction side A. The converter is designated C. The length of the suction side A normally amounts to at most 250 m, while the length of the pressure side may be, for example, 10 km.

Figure 3:
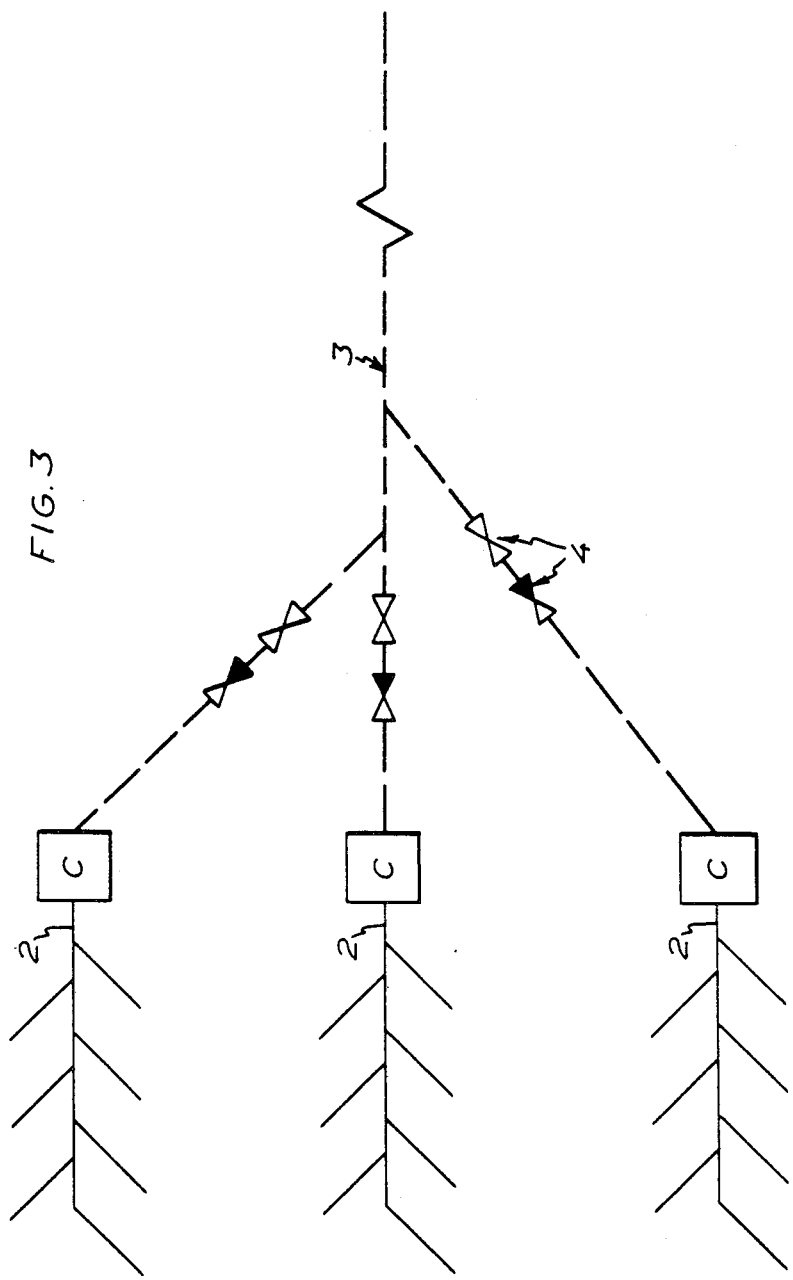
FIG. 3 shows a larger system with three groups of waste disposal units.

FIG. 3 shows a somewhat larger system in which the possibility, according to the invention, of placing the converter station as close to the waste source as possible has been utilized, such that the waste disposal points of the system have been divided up into three groups each with a main vacuum conduit 2. Three converter stations C pressure feed the waste out to a common sewer 3 by the intermediary of non-return valves 4 which ensure that no waste water is pumped from one converter C to another.

Figure 4:
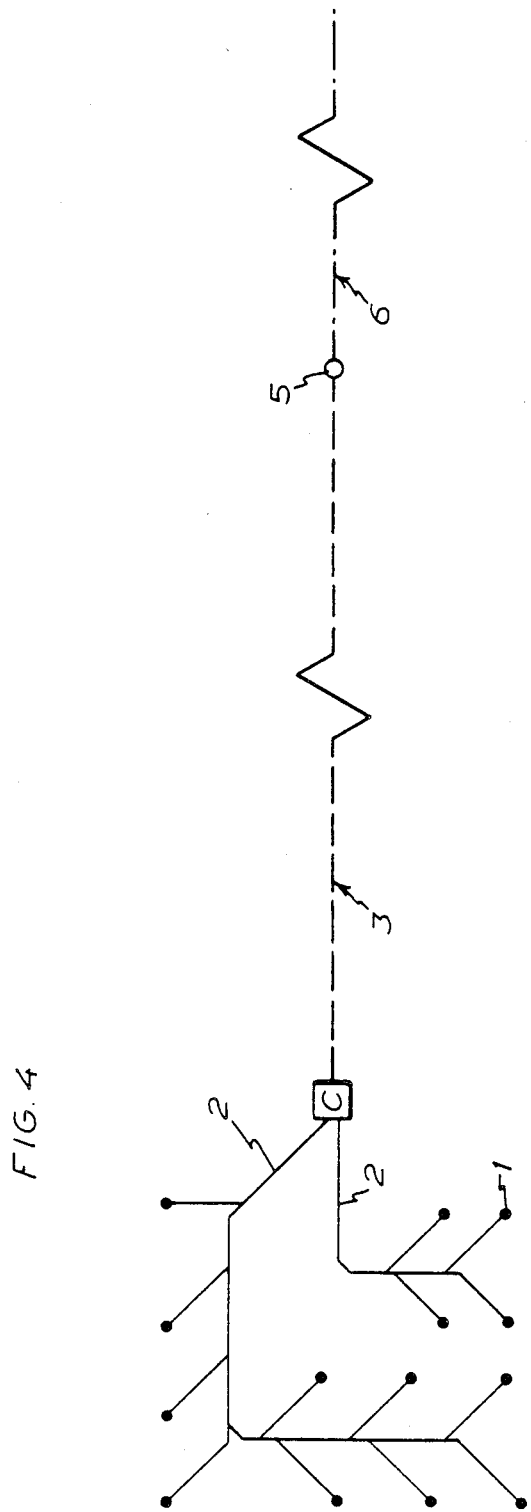
FIG. 4 illustrates a further system according to the invention.

FIG. 4 shows how the group of waste disposal units is coupled, by means of two main vacuum conduits 2 to a converter C, whose pressure sewer 3 discharges in a well 5 whence the water runs out over a free drop into an extant municipal sewer 6.

Figure 5:
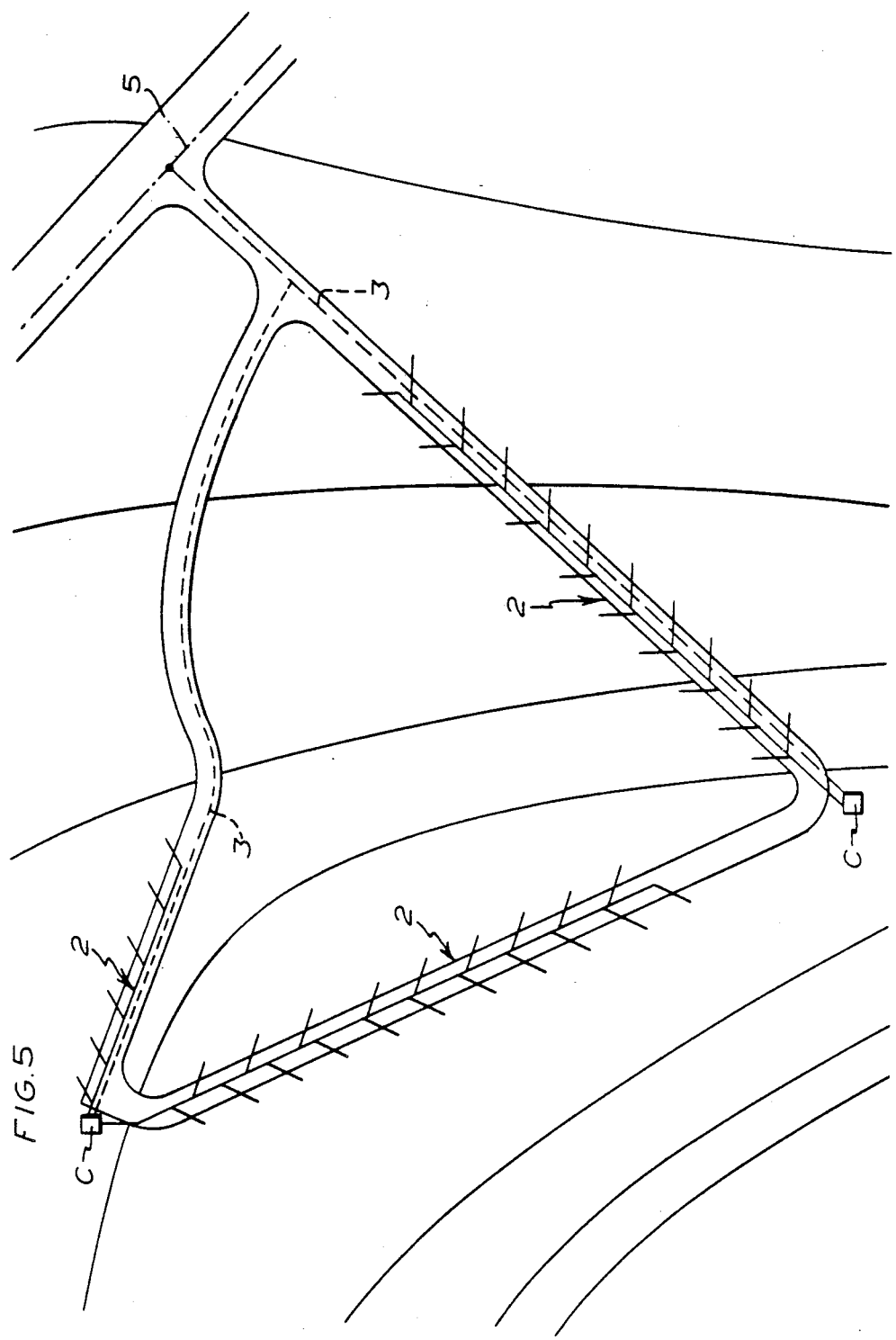
FIG. 5 shows one embodiment according to the invention in practice.

FIG. 5 shows a practical embodiment of an installation in terrain where there is a height difference of 6 m between the lowest connection point and an extant sewer, and where the provision of a conventional vacuum closet installation with connection to the sewer would, thus, have been impossible. The placing of converters C at suitable points will result in short receptacle conduits with slight differences in height, the greater height differences being overcome by the pressure side of the coverter C.

As will be apparent from the above, the invention may form the springboard of a break-through for water-miser waste disposal technology on a large scale with low installation costs, a high level of operational reliability and low running costs. At the same time, the built-in water purification process will relieve loading on waste water treatment plants. The system can be constructed to a great extent from known components, which has a positive influence on costs and contributes to operational reliability.

What I claim and desire to secure by Letters Patent is:

1. A sewage system for a plurality of sewage producing units, which are arranged to be emptied by applying partial vacuum to a sewer pipe connected to said sewage producing units comprising a group of sewage producing units; a group of sewer pipes connected to the group of sewage producing units; a remote transport system; and a pressure converter having an inlet connected to the sewer pipes and an outlet connected to the remote transport system, said pressure converter comprising:

a jet pump of ejector type having a first inlet for driving fluid, a second inlet at which partial vacuum is developed when driving fluid under pressure is delivered to said first inlet, and an outlet from which driving fluid and fluid drawn into the pump by way of the second inlet are ejected from the pump, said second inlet being the inlet of the pressure converter and said jet pump being operative to draw sewage through said sewer pipes and eject sewage from the jet pump by way of the outlet thereof;

a container under atmospheric pressure connected to the outlet of the jet pump for receiving sewage and driving fluid which are ejected therefrom;

a second pump connected to draw waste water from the container and deliver it to the first inlet of the jet pump as driving fluid; and a waste water pump having an inlet connected to said container and an outlet which is the outlet of the converter, said waste water pump being operative to pump the contents out of said container under superatmospheric pressure into the remote transport system.

2. A sewage plant for a plurality of sewage producing units comprising a group of sewage producing units; a group of sewer pipes connected to the sewage producing units respectively; a remote transport system; and a pressure converter connected to receive sewage from the sewer pipes and deliver it under excess pressure into the remote transport system, the pressure converter including pump means connected to the sewer pipes for conveying sewage along the sewer pipes by establishing a partial vacuum therein, and a container which is exposed to atmospheric pressure and through which sewage received from the pump means passes before being delivered into the remote transport system.

3. The plant according to claim 2, in which means are provided in the pressure converter for comminuting solid components of the sewage to a size of less than approximately 1 mm.

4. The plant according to claim 2, in which said container is dimensioned to accommodate at least one day's waste from said sewage producing units.

5. The plant according to claim 2, in which said pump means comprises a liquid-driven jet pump, and the converter further comprises a second pump connected to draw waste water from the container and deliver it to the jet pump as driving liquid.

6. The plant according to claim 5, in which said second pump is a centrifugal pump, for comminuting solid components of the sewage in the container to a size of less than approximately 1 mm.

7. The plant according to claim 2, wherein the pressure converter comprises a centrifugal pump for drawing sewage from the container and delivering it under excess pressure into the remote sewage system.

* * * * *